US012367076B2

(12) United States Patent
Raza et al.

(10) Patent No.: US 12,367,076 B2
(45) Date of Patent: Jul. 22, 2025

(54) METHOD FOR PROCESS ALLOCATION ON MULTICORE SYSTEMS

(71) Applicant: Robert Bosch GmbH, Stuttgart (DE)

(72) Inventors: Syed Aoun Raza, Stuttgart (DE); Amal Jose Vallavanthara, Stuttgart (DE); Nidavani Rakesh, Karanataka (IN)

(73) Assignee: ROBERT BOSCH GMBH, Stuttgart (DE)

( * ) Notice: Subject to any disclaimer, the term of this patent is extended or adjusted under 35 U.S.C. 154(b) by 517 days.

(21) Appl. No.: 17/941,119

(22) Filed: Sep. 9, 2022

(65) Prior Publication Data
US 2023/0098447 A1    Mar. 30, 2023

(30) Foreign Application Priority Data
Sep. 30, 2021    (DE) ................ 10 2021 211 020.7

(51) Int. Cl.
*G06F 9/50* (2006.01)
*G06F 17/16* (2006.01)

(52) U.S. Cl.
CPC ............ *G06F 9/505* (2013.01); *G06F 9/5027* (2013.01); *G06F 17/16* (2013.01)

(58) Field of Classification Search
None
See application file for complete search history.

(56) References Cited
U.S. PATENT DOCUMENTS
2022/0050729 A1* 2/2022 Diot ............... G06F 18/231

OTHER PUBLICATIONS

Krau et al., "A highly efficient multi-core algorithm for clustering extremely large datasets", 2010, BMC Bioibformatics, pp. 1-16. (Year: 2010).*
Dhillon et al., "A Data-Clustering Algorithm on Distributed Memory Multiprocessors", 2002, Springer-Verlag Berlin Heidelberg, pp. 245-260. (Year: 2002).*
Jalalian et al., "A hierarchical multi-objective task scheduling approach for fast big data processing", Jun. 28, 2021, Springer, pp. 2307-2336. (Year: 2021).*
Amalthea, "An Open Platform Project for Embedded Multicore Systems," Downloaded Aug. 25, 2022, pp. 1-3. <http://www.amalthea-project.org/>.

* cited by examiner

*Primary Examiner* — Qing Yuan Wu
(74) *Attorney, Agent, or Firm* — NORTON ROSE FULBRIGHT US LLP

(57) ABSTRACT

A method for providing an allocation of software processes in a software application to multiple cores in a multi-core processing system having k available cores. The method includes obtaining a spatial representation of the software processes in a two-dimensional plane, wherein each process corresponds to a node in said two-dimensional plane. For all nodes, the distance of any two nodes is proportional to the communication load between processes represented by the two nodes. The method includes clustering the nodes into k clusters, wherein a number k of clusters is selected as a number of available cores in the multi-core processing system; and allocating the software processes to the k cores, wherein each one of said final set of clusters of nodes is allocated to a different one of said cores.

13 Claims, 2 Drawing Sheets

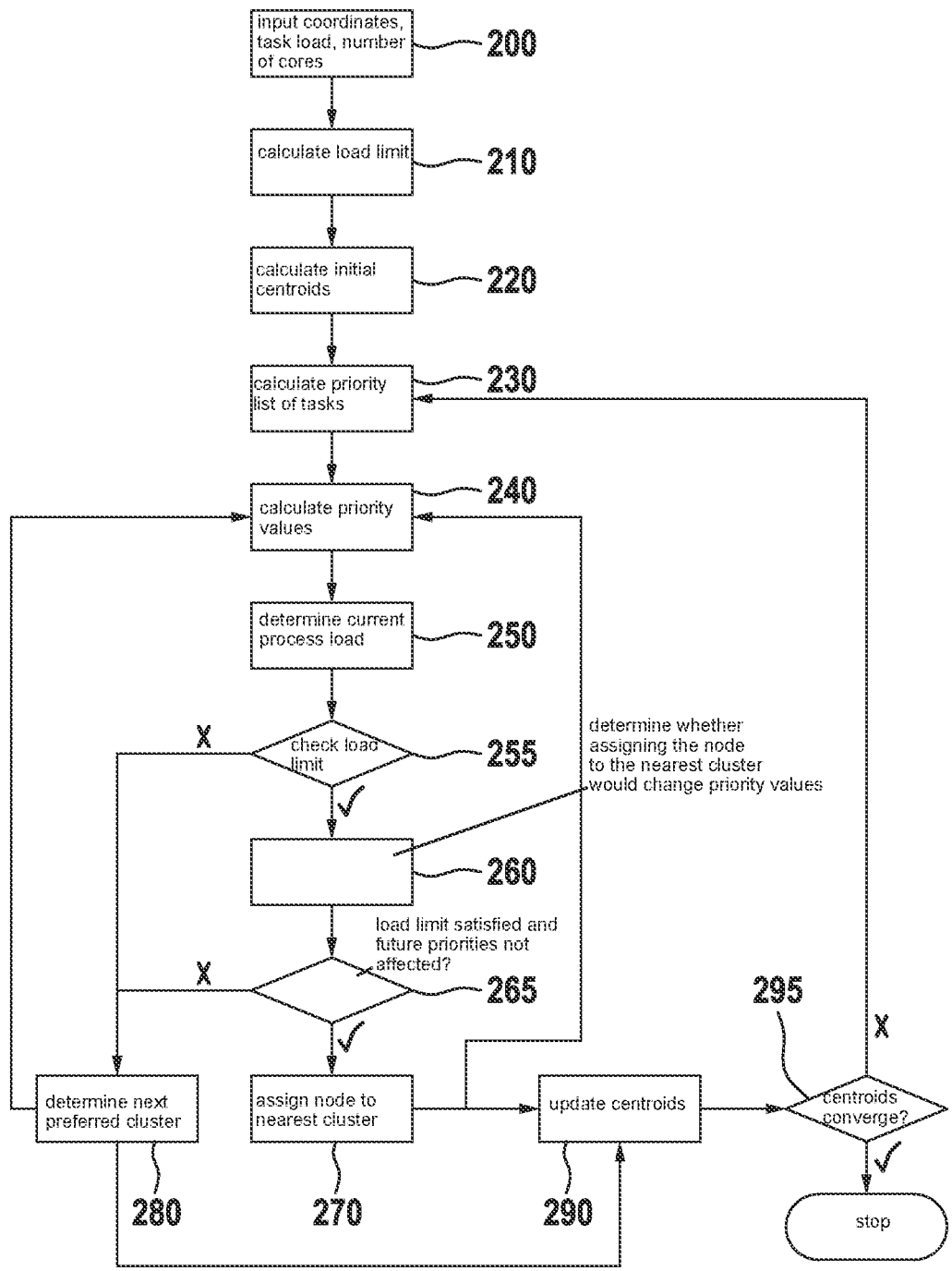

METHOD FOR PROCESS ALLOCATION ON MULTICORE SYSTEMS

CROSS REFERENCE

The present application claims the benefit under 35 U.S.C. § 119 of German Patent Application No. DE 10 2021 211 020.7 filed on Sep. 30, 2021, which is expressly incorporated herein by reference in its entirety.

FIELD

The present invention is related to a method for process allocation onto multiple processing cores and a computer program for performing the method.

BACKGROUND INFORMATION

Computer processing systems in practically all different fields of application, such as signal processing, graphics, networking or embedded systems use processors with multiple integrated processing cores. Multi-core systems allow for enhancing the efficiency of computing tasks by parallelization of the computing processes, i.e. by breaking tasks down in several elements that may be computed in parallel on the cores. However, the parallelization of software code—which may contain millions of lines of code and may have been optimized for single-core systems—for such architectures is not trivial.

An important application of multicore systems is within the field of automotive computing architecture, where software based control, modelling and analysis are increasingly significant. Usually, one or more control units (ECU, engine control units) may be implemented as an embedded multi-core ECU. The software running on these ECUs includes a large number of smaller, interacting processes as well as complex models which require extensive computing capacities. At the same time, many software architectures in the automotive fields have been developed for single-core units over decades and are highly standardized.

Various methods and platforms are available for aided design and optimization of software code for multi-core systems. For example, the Eclipse APP4MC platform including the AMALTHEA model project offers a model based approach for partitioning application code and mapping the code partitions onto multiple cores. Still, optimizing the parallelization of tasks while taking into account the communication load and timing constraints of largely safety-critical computing processes in the automotive field continues to pose significant challenges.

SUMMARY

According to the present invention, a method for load balancing and process allocation on multiple processing cores is provided. Example embodiments of the present invention are disclosed herein.

In particular, according to the present invention, a method is provided for an allocation of software processes in a software application to multiple cores in a multi-core processing system having k available processing cores. According to an example embodiment of the present invention, the method comprises obtaining a spatial representation of said software processes in a two-dimensional plane, wherein each process corresponds to a node in said two-dimensional plane, and wherein for all nodes, the distance of any two nodes is proportional to the communication load between processes represented by said two nodes; and clustering said nodes into k clusters, wherein a number k of clusters is selected as a number of available cores in said multi-core processing system.

In more detail, according to an example embodiment of the present invention, the clustering step comprises a) defining a maximum load per cluster for said k clusters based on a maximum process load per core; b) defining k initial clusters of nodes by assigning each node to one of said k clusters, and calculating an initial current centroid for each cluster based on the position of all nodes within said each cluster; c) reassigning each node to one of said k clusters, based on a distance of said node to a current centroid of said cluster, on the defined maximum process load per core, and on a dynamic priority value of said node; d) recalculating a current centroid of each cluster based on the clusters obtained by said reassigning of nodes; and e) repeating said reassigning step c) and said centroid calculation step d), until said centroids converge, thus obtaining a final set of clusters defined by assigned nodes. Finally, the final set of clusters is used for allocating said software processes to said k cores, wherein each one of said final set of clusters of nodes is allocated to a different one of said cores.

Using such a modified k-means clustering algorithm for allocating processes to multiple cores allows to consider the load of each process (task/interrupts), the maximum load allowed per core as well as the communication between processes. In this way, overall inter-core communication can be decreased and processes may be efficiently parallelized.

According to some embodiments of the present invention, the dynamic priority value of a node may be defined for each centroid as a process load exerted by a process represented by said node on a core, divided by a distance of the node from a given cluster centroid.

Also, a maximum load per cluster may for example be defined as a sum of process loads of each process represented by a node, divided by said number k of cores. In other cases, process loads may be predefined by a user or by other methods.

The reassignment may optionally include the following steps:
    determining, for a node to be reassigned, a nearest cluster by determining the cluster centroid having a minimal distance to said node; determining a current process load for said nearest cluster as a sum of process loads of all nodes currently assigned to said nearest cluster, and reassigning said node to said nearest cluster if the current process load of said nearest cluster is less than the maximum load per cluster (i.e. the maximum core load).

In addition, an optional step may be used to determine the effect of a node reassignment on other clusters and nodes by determining, for a node to be reassigned, a nearest cluster by determining the cluster centroid having a minimal distance to said node; determining, for all nodes that have not yet been reassigned in a current reassigning step, whether assigning said node to the determined nearest cluster would change priority values of said not yet reassigned nodes, and by only reassigning said node to said nearest cluster if the change of priority levels is below a predetermined threshold.

In addition or as an alternative, the method may include calculating, for a node to be reassigned, said dynamic priority value for each centroid of said k clusters, and forming a sorted priority list of clusters for said node based on said priority value; and if said node cannot be reassigned to said nearest cluster, determining a next preferred cluster based on said priority list.

The spatial representation of said software processes that is used for determining the clusters may for example be obtained by a spectral embedding of a communication network graph, wherein said communication network graph is defined by nodes representing said software processes and edges representing a communication between said software processes.

To take the amount of communication between processes into account, i.e., a communication load between processes, the spectral embedding may be determined based on the graph Laplacian matrix of said network communication graph, and said graph Laplacian matrix may be weighted by multiplication with a weight factor proportional to the inter-process communication between two processes which are represented by two nodes. The weight factor may preferably be directly proportional to the communication load between two nodes.

There are several options for obtaining the information for the spatial representation of processes and/or the network communication graph. For example, these may be determined on information obtained from an application model which includes at least a plurality of software processes obtained by partitioning said application, a processing load exerted by each software process on a processing core; and information on communication between any of said plurality of software processes. The model may further include hardware information, such as number of available cores, maximum core load, and others.

One example of such an application model which is particularly suitable for multi-core software is an AMALTHEA model.

From the obtained set of clusters in a final step, an optimized application model may be built based on the determined allocation of said software processes to said k cores.

A data processing system such as a computer may be equipped with means (such as a processor) to perform the method steps previously described.

Additionally, it is preferable to implement the presented method in a computer program code or computer program product including code for executing the method steps. Finally, a machine-readable storage medium may be provided with a computer program stored thereon as described above. Suitable storage media or data carriers for providing the computer program are, in particular, magnetic, optical and electrical storage media, such as hard disks, flash memory, EEPROMs, DVDs, and others. It is also possible to download a program via computer networks (Internet, intranet, etc.). Such a download may be wired or wireless (e.g. via a WLAN network, a 3G, 4G, 5G or 6G mobile communication connection, or others).

BRIEF DESCRIPTION OF THE DRAWINGS

Exemplary embodiments of the present invention will be described with reference to the figures.

FIG. 2 is a flow diagram showing steps of an exemplary algorithm for mapping software processes to multiple cores, according to the present invention.

DETAILED DESCRIPTION OF EXAMPLE EMBODIMENTS

Figure 1:
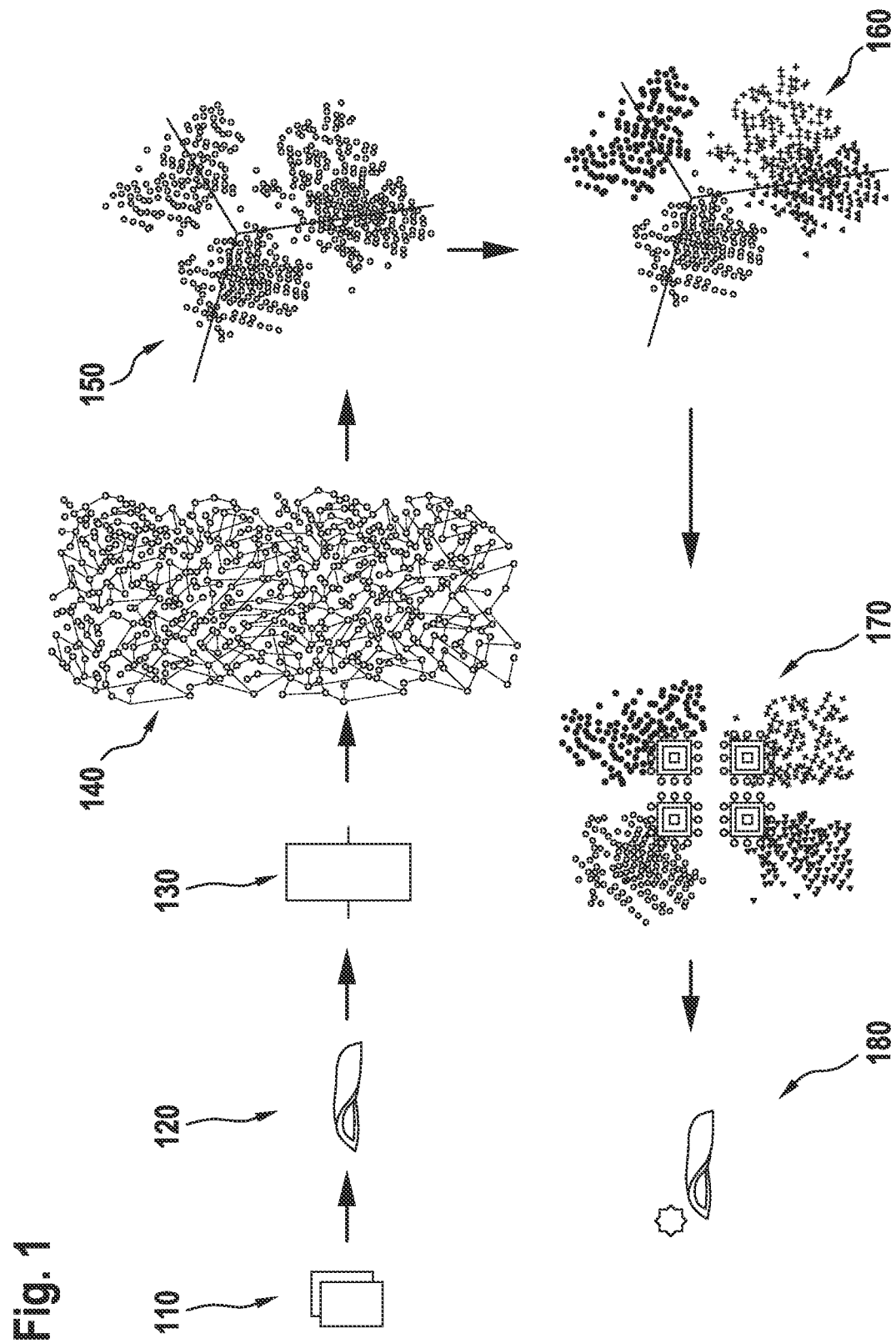
FIG. 1 is a schematic illustration of an exemplary process for allocation of software applications to multiple cores according to an embodiment of the present invention.

The design of multi-core software architecture aims to obtain maximum efficiency by intelligent distribution and balancing of processing tasks of a software application to the multiple processing cores of a processing system. The term "multi-core" is used broadly in this description for any kind of system having two or more integrated processing units for reading and executing computer program instructions. In particular, multi-core systems include both dedicated CPU and embedded systems. Cores in a multi-core system may or may not share memory elements such as caches, and they may implement various inter-core communication methods and network architectures for connecting the cores. The term also includes manycore processors, which are multi-core processors containing numerous simpler, independent processor cores from a few tens of cores to thousands or more. Manycore processors are therefore especially suited for a high degree of parallel processing.

In order to provide a software architecture for a multi-core system, the available software applications may be partitioned into defined execution units such as runnables or tasks, and these may then be assigned to specific processor cores in order to balance the processing load onto all cores. Applications which have been partitioned and allocated in this way may utilize the benefits of parallel processing in the cores and thus allow faster execution of applications.

The partitioning of the software architecture should take into consideration the load of each process (task/interrupts), the maximum load allowed per core, and the communication between processes. It is preferable to distribute processes on to multicore systems such that the dependency between cores becomes be minimal. This would decrease overall inter-core communication, thereby decreasing network traffic on the communication channels between cores.

Allocation of automotive software processes on multicore systems therefore has multiple objectives:
- minimize or reduce inter-core communication;
- minimize or reduce network traffic on communication bus;
- minimize or reduce execution time of tasks; and
- ensure that the maximum load per core is not exceeded.

A schematic of the steps and intermediate products involved in an exemplary process for allocation of software applications to multiple cores according to the present invention is shown in FIG. 1.

In a first step, a software application model 120 may be generated from source code 110 and data files for a software application. Such an application model may for example be derived on the AMALTHEA platform, which is a model based platform for designing, modelling and simulating multi-core adapted software.

An AMALTHEA model usually involves three separate models: a hardware model, a software model, and a constraints model. The hardware model may include information such as the number of processor cores, a system clock frequency for the processors, or details on memory connected with the cores. Each multi-core processing system may be modelled in a hierarchical manner in the hardware model. The software model may e.g. be based on defining small execution units (runnables), tasks, read and write accesses to memory (label access), and others within the application code. Binary analysis tools and decomposition techniques for building the software model from code are described in the related art and will not be detailed here. Finally, the constraints model may for example provide information on dependencies, sequences of runnables, timing constraints, and other conditions of executing the code. All data of the model may be provided and stored in a suitable format, such as XML (extensible markup language) or an eclipse EMF (eclipse modelling framework) model.

Further details of AMALTHEA modelling which may be employed for purposes of this invention may be found at http://www.amalthea-project.org/. However, it is understood that other methods of modelling applications for multi-core use may also be employed in this step, as long as they allow for obtaining communication vectors which may be transformed into a network graph, as will be discussed in detail below.

From the information in the application model 120, communication vectors 130 may be formed. These communication vectors may include communication and load related information for tasks, processes, read/write accesses an others. For example, the communication vector may be based on the following information: inter process communication; inter core communication; maximum permissible core load of the available cores; and process load of each process or task. A communication matrix T may for example be defined as follows:

$T^{ij}$=Number of communications from Task i to Task j multiplied by a number of times task i is executed in a given pre-defined time frame.

The communication vectors 130 may then be transformed in a network graph 140. Again, the general application of network graph theory for analysing communication-based processes is described in the related art and not detailed any further.

In order to obtain a simpler problem to be solved, the network graph 140 may be converted into a representation on a two-dimensional plane by spectral embedding 150. The edges of the network graph are removed and the nodes are placed within the plane such that the distance between two nodes represents the amount of communication between the nodes, that is, two nodes that are placed closer to each other communicate more compared to nodes that are placed far apart.

The spectral embedding 150 of the network graph 140 may be obtained by determining the first and second Eigen vectors of the Laplacian matrix of the network graph, as will be shown below.

Let us consider a Graph Laplacian matrix $L_G$ such that:

$$L_G = \sum_{i,j} L_{ij} \quad (1)$$

where indices i and j indicate the ith row and jth column of the matrix, respectively.

The Graph Laplacian Matrix is used to represent the communication between two nodes (i.e., two processes or tasks) i and j. Therefore, the value of $L_{ij}$ is $$L_{ij} = \begin{cases} 0, & \text{if } i, j \text{ do not interact} \\ 1, & \text{if } i = j \\ -1, & \text{if } i \text{ and } j \text{ interact} \end{cases} \quad (2)$$

For the desired load balancing on the processes and the minimization of communication, information regarding the amount of communication between processes should be included in the network graph. In order to include such information, the graph Laplacian matrix may be multiplied with a weight factor:

$$L_G = \sum_{i,j} L_{ij} \cdot w_{ij} \quad (3)$$

wherein each element $w_{ij}$ of the weight factor indicates the amount of communication between the $i^{th}$ and $j^{th}$ node of the network graph.

Then, the Eigen vectors of the weighted Laplacian matrix may be determined. Producing the Eigen vectors of a Laplacian matrix of a graph is generally conventional in the related art and can be implemented based on conventional libraries.

Let us consider a cut matrix $x_c$ with elements $x_c$, such that:

$$x_c \in \{\pm 1\}^n \quad (4)$$

The $i^{th}$ element $x_c$ of the cut matrix indicates whether the $i^{th}$ element of the Graph Laplacian Matrix $L_G$ lies in the first or second cluster when the data is partitioned into two.

$$x^T L_G x = x_i^2 + x_j^2 - 2x_i x_j = (x_i - x_j)^2 \in \begin{cases} 0, & \text{for } i,j \text{ on the same side} \\ 4, & \text{for } i,j \text{ on opposite sides} \end{cases} = \quad (5)$$

$$4 \cdot [\text{Number of edges of network graph } G \text{ cut by } X]$$

Since a sum of squares is always non-negative, it follows from equation (5) that $$0 \leq (x_i - x_j) \quad (6)$$

$$0 \leq x^T L_G x \quad (7)$$

Since we want to cut the vector into exactly half, the vector would consist of exactly equal numbers of +1 and −1. Thus, the sum of the elements of vector $x_c$ is 0, $$\sum_k x_k = 0 \quad (8)$$

$x_c$ is, therefore, an orthogonal matrix represented by:

$$x_c \perp 1 \quad (9)$$

We need to find the minimum number of lines that would cut the Graph Laplacian Matrix, $L_G$, which is $$\min_{\substack{x_c \perp 1 \\ x_c \in \{\pm 1\}^n}} (x^T L_G x) \quad (10)$$

This quantity is easy to compute and is also known to equal the second smallest eigenvalue $v_2$ of the Laplacian Matrix. Therefore, the above equation is given by:

$$v_2 = \min_{\substack{x_c \perp 1 \\ x_c \in \{\pm 1\}^n}} (x^T L_G x) \quad (11)$$

The chosen third Eigen vector should be perpendicular to the second Eigen vector, $x_c \perp v_2$. The third Eigen vector $v_3$ is therefore given by the equation $$v_3 = \min_{\substack{x_c \perp 1 \\ x_c \in \{\pm 1\}^n \\ x_c \perp v_2}} (x^T L_G x) \quad (12)$$

The second and third Eigen vectors may then be plotted on the x and y-axis of a two-dimensional plane. This provides a spectral embedding of the original network graph G. The plots thus obtained represent a transformation of the network matrix.

This spectral embedding 150 of the network graph 140 may then be clustered using a suitable clustering algorithm, such as the k-means algorithm, which is a method of unsupervised machine learning for clustering n data elements into k sets or clusters S of data elements. Clustering aims to partition the nodes such that nodes that are geometrically closer to each other are placed in the same cluster. In terms of processes and cores of a multi-core system, a partitioning of processes is required which would minimize communication between cores, such that each determined cluster of processes, tasks or runnables may be assigned to one of the cores.

In the following, the naïve k-means algorithm is shortly introduced.

k initial means or centroids $m_1^{(1)}, \ldots, m_k^{(1)}$ are placed randomly at k different positions in a first step. In the present case, k is selected as the number of available cores in the multi-core system, or generally as the number of cores that shall be used for the present application.

The distance of each node to the nearest centroid $m_i^{(1)}$ is calculated. The nodes $x_p$ whose nearest centroids is $m_i$ are temporarily placed in the $i^{th}$ cluster $S_i$, i.e. each node is assigned to its nearest centroid:

$$S_i^{(t)} = \{x_p : \|x_p - m_i^{(t)}\|^2 \leq \|x_p - m_j^{(t)}\|^2 \forall j \text{ with } 1 \leq j \leq k\} \quad (13)$$

where t indicates the current step of iteration, $S_i^{(t)}$ is the set of nodes currently allocated to the $i^{th}$ cluster, $m_i^{(t)}$ is the coordinate of the centroid of cluster $S_i^{(t)}$, $x_p$ is the $p^{th}$ node and k is the number of clusters. That is, if the distance of the node $x_p$ in question to centroid $m_i^{(t)}$ is less or equal to the distances of the node to all other centroids, this node is assigned to cluster $S_i$. Each node is therefore assigned to exactly one cluster $S_i^{(t)}$ at a time, but may be assigned to a different cluster in a next step.

The arithmetic mean of all the node coordinates belonging to each cluster is calculated and assigned to the corresponding centroid, thus representing the updated centroid $m_i^{(t+1)}$ of the newly defined cluster to be used in the next step (t+1) of iteration:

$$m_i^{(t+1)} = \frac{1}{S_i^{(t)}} \sum_{x_j \in S_i^{(t)}} x_j \quad (14)$$

The above steps are repeated until the centroids converge, i.e. essentially don't get updated anymore from one iteration to the next.

Since the distance of nodes in the spectral embedding corresponds to the amount of communication between the processes, this method of naïve k-means clustering separates the processes of the application into clusters based on inter process-communication, but does not take other factors into consideration for clustering.

This poses two challenges: for one, the user will not be able to set a limit to the sizes of the cluster. This limits the user's ability to set a maximum load to a core. Also, in complex automotive models, a majority of the tasks interact closely with each other. This method of naïve clustering would then assign a majority of processes to the same huge cluster. Few interrupts with low significance that are away from the epicentre would then be grouped into tiny separate clusters. Such a mapping would be contrary to the idea of equal distribution of software architecture to multiple cores.

To overcome this, additional load parameters may be included in the k-means algorithm. A weight may be assigned to each node, which is directly proportional to the amount of load a task or process occupies in the system. This load may depend on various factors, such as the amount of read/write accesses to memory, stimuli information, or execution time.

Before each assignment of a node to a cluster, it may be verified if the maximum permissible load of the cluster/core has already been reached by determining the sum of the loads of all nodes (processes) currently assigned to a cluster. In such a situation, the node is assigned to the next proximate centroid.

However, this gives rise to new enigmas, as the order of assignment of nodes to centroids becomes critical. At times, a certain high load node may seize an entire cluster rather than allowing multiple lightweight nodes to occupy the cluster, thus bringing down the overall inter-cluster communication. While assigning a node, the algorithm should preferably consider both the volume of communication and the load of the node.

The algorithm should also be able to "foresee" the future. While assigning tasks to clusters, it should be able to guess if the occupation of the task in the particular cluster would drastically affect other tasks that have not yet been assigned. Thus, a priority of tasks may be considered, based on the amount of inter-task communication and the load. The algorithm may create data representing the cluster preferences of each node. On assignment, it checks if assigning the particular task to its first preference (the closest centroid) would drastically affect the other unassigned tasks. If the effects are drastic, the task is assigned to its second favourite cluster. In this way, an additional layer may be introduced between the updating and assignment layer of k-means clustering.

The following is a more detailed explanation of the proposed modified clustering algorithm. First, a maximum proposed default capacity C of a cluster is given as the sum of all process loads equally distributed across cores:

$$C = \sum_{i=1}^{n} \frac{l_i}{k} \quad (15)$$

where $l_i$ is the load of task/node i, n is the number of processes obtained from partitioning the application, and k is the number of cores. This allows the algorithm to check whether a maximum load of a core is reached. However, it is also possible to define the cluster capacity in other ways or to set a manual capacity value for each cluster.

Initial centroids may be selected by selecting the farthest points from each other. The equation to find these is as follows:

$$\min \sum_{g=1}^{n} \mathcal{F}(x_g, y_g)^k \text{ with } \mathcal{F}(x_g, y_g)^k = \sum_{k,j}^{k} \sqrt[2]{(x_i^2 - x_j^2)^2 - (y_i^2 - y_j^2)^2} \quad (16)$$

Other starting points might be used as initial centroids alternatively.

A priority of each task to be assigned may be defined in dependency of a given centroid j by:

$$\text{Priority } P_i = \frac{l_i}{d_{ij}} \quad (17)$$

where $d_{ij}$ is the distance of the centroid j to the node i, and $l_i$ is the load of node i.

The centroid (X,Y) for each cluster may then be calculated based on the weights. Let $(x_1, y_1), (x_2, y_2), \ldots (x_j, y_j)$ be the coordinates of the members of the cluster of centroid $(X_j, Y_j)$.

$$X_j = \sum_{m=1}^{j} (x_m \cdot l_m) \frac{1}{\left(x_m \sum_{m=1}^{j} l_j\right)} \quad (18)$$

$$Y_j = \sum_{m=1}^{j} (y_m \cdot l_m) \frac{1}{\left(y_m \sum_{m=1}^{j} l_j\right)} \quad (19)$$

References will now be made to FIG. 2. As with the naïve k-means algorithm, the assignment of a node to a cluster in each iteration step is based on finding the centroid having the minimal distance to this node. The steps 230 to 295 are repeated until the centroids converge, but now the priority value $P_i$ and the load limit C per cluster are included as additional constraints in the algorithm. In each iteration step, a sorted priority list for the node/process to be assigned may be formed by calculating 240 priority values for the node to all centroids based on equation (17). Then, when the nodes are to be assigned to centroids, the load limit is checked in step 255. If the load limit is satisfied and future priorities are not affected (step 265), the node may be assigned 270 to the nearest cluster. Alternatively, instead of using both the load limit and the future priorities as constraints, other embodiments may employ only one of these conditions for assigning a node. If both conditions are used, they may be checked in any suitable order or in parallel. If the node cannot be assigned to the nearest cluster, the calculated priority list may be used to determine 280 a preferred cluster based on the priority. Before the next step is performed and the next node is assigned, the current load of each cluster may be updated based on the recent assignment. Finally, after all nodes have been assigned to a cluster, the centroids are updated in step 290 for the next iteration step. A final set of clusters 160 defined by the assigned nodes is obtained when the centroids converge, i.e. don't change anymore (or only below a threshold) between iterations, which is checked in step 295.

This modified k-means clustering is therefore able to allocate the nodes into separate clusters 160 of appropriate sizes and has the following capabilities:

Each of the nodes are assigned a weight proportional to the load of the process it represents. Each resultant cluster is not allowed to have a load greater than maximum permissible level.

The nodes are assigned a priority based on the distance from the cluster centroid and load of the node. This priority is used to determine the cluster assignment in every round of the modified cluster rather than the distance from the centroid.

The resultant node clusters 160, i.e. the output of the clustering algorithm, may then be converted to a vector with task core mapping information and may be used for core assignment 170 of the processes or tasks which have been represented by nodes. The core assignment 170 may be used as desired, for example by building an optimized software model such as an AMALTHEA model based on the new core mapping.

The following is a schematic algorithm flow of this modified clustering algorithm according to an exemplary embodiment of the present invention and with reference to FIG. 2:

---

Input [step 200]:
 Coordinates $(x_m, y_m)$ of each node
 Task Load $(l_m)$ of each node
 k = number of cores
Output:
 k clusters of nodes
Procedure:
 Calculate initial k centroids (e.g. using equation (16)) – [step 220]
 Calculate load limit [step 210] per cluster based on equation (15), or load limit provided by user
 while not converged [check in step 295]:
  calculate [steps 230, 240] priority list of tasks to each centroid with equation (17)
   for each node $(x_i, y_i)$ :
   while load limit C (constraint (15)) is satisfied [check in steps 250, 255] and future priorities are not affected [check in steps 260, 265], get next best cluster $(X_j, Y_j)$ [step 270]
   get preferred cluster based on its priority from list created using equation (17) [step 280, only executed if next best cluster is not allowable]
    end while
   update load of cluster $(X_j, Y_j)$
   assign$(x_i, y_i)$ to $(X_j, Y_j)$ [steps 270, 280]
   end for
   update centroid $(X_j, Y_j)$ using equations (18) and (19) [step 290]
  end while

---

Each node $(x_i, y_i)$ assigned to each centroid $(X_j, Y_j)$ represents the final clusters.

The output of the clustering algorithm may be used to define a vector indicating the optimized process core allocation for each process. This output may then be used to generate a new core-to-process allocation model, which is in a further step integrated into a new, updated AMALTHEA model with optimized core allocation.

Generally, the above clustering mechanisms may be used for any granularity of partitioned processes, i.e. for smallest execution units/runnables, but also for larger tasks or sub-processes which comprise several runnables.

The steps of mapping processes to cores by use of the algorithms defined above may also be combined with further steps for multi-core design and model optimization, such as tracing. It is also understood that the core mapping may be repeated several times, in particular when parameters of the underlying software application model (such as an AMALTHEA model) have been changed by other methods and processes.

What is claimed is:

1. A method for providing an allocation of software processes in a software application to multiple cores in a multi-core processing system having k available cores, comprising:
 obtaining a spatial representation of the software processes in a two-dimensional plane, each process of the software processes corresponds to a node in the two-dimensional plane, and, for all nodes, the distance of any two nodes is proportional to a communication load between processes represented by said two nodes;
 clustering the nodes into k clusters, wherein a number k of clusters is selected as a number of available cores in the multi-core processing system, the clustering step including:
  a) defining a maximum load per cluster for the k clusters based on a maximum process load per core;

b) defining k initial clusters of nodes by assigning each node to one of the k clusters, and calculating an initial current centroid for each cluster based on the position of all nodes within each cluster;

c) reassigning each node to one of the k clusters, based on a distance of the node to a current centroid of the cluster, on the defined maximum process load per core, and on a dynamic priority value of the node;

d) recalculating a current centroid of each cluster based on the clusters obtained by the reassigning of nodes; and e) repeating the reassigning step c) and the centroid calculation step d), until the centroids converge, thus obtaining a final set of clusters defined by assigned nodes;

allocating the software processes to the k cores, wherein each one of the final set of clusters of nodes is allocated to a different one of the cores.

2. The method of claim 1, wherein the dynamic priority value of each node is defined for each node as a process load exerted by a process represented by the node on a core, divided by a distance of the node from a given cluster centroid.

3. The method of claim 1, wherein the maximum load per cluster is defined as a sum of process loads of each process represented by a node, divided by the number k of cores.

4. The method of claim 1, wherein said reassigning further includes:

determining, for a node to be reassigned, a nearest cluster by determining the cluster centroid having a minimal distance to the node to be reassigned;

determining a current process load for the nearest cluster as a sum of process loads of all nodes currently assigned to the nearest cluster; and reassigning the node to be reassigned to the nearest cluster based on the current process load of the nearest cluster being less than the maximum load per cluster.

5. The method of claim 1, wherein the reassigning further includes:

determining, for a node to be reassigned, a nearest cluster by determining the cluster centroid having a minimal distance to the node to be reassigned;

determining, for all nodes that have not yet been reassigned in a current reassigning step, whether assigning the node to be reassigned to the determined nearest cluster would change priority values of the not yet reassigned nodes; and reassigning the node to be reassigned to the nearest cluster based on the change of priority levels being below a predetermined threshold.

6. The method of claim 4, wherein the reassigning further includes:

calculating, for a node to be reassigned, the dynamic priority value for each centroid of the k clusters; and forming a sorted priority list of clusters for the node to be reassigned based on the dynamic priority values; and when the node to be reassigned cannot be reassigned to the nearest cluster, determining a next preferred cluster based on the priority list and reassigning the node to be reassigned to a next preferred cluster.

7. The method of claim 1, wherein the spatial representation of the software processes is obtained by a spectral embedding of a communication network graph, wherein the communication network graph is defined by the nodes representing the software processes and a spacing between the nodes indicating an amount of communication between the nodes, wherein the distance between the nodes is inversely proportional to the amount of communication.

8. The method of claim 7, wherein the spectral embedding is determined based on a graph Laplacian matrix of the network communication graph, and wherein the graph Laplacian matrix is weighted by multiplication with a weight factor proportional to inter-process communication between two processes which are represented by two nodes.

9. The method of claim 7, wherein the network communication graph is determined on information obtained from an application model, which includes at least the following:

a plurality of software processes obtained by partitioning the application;

a processing load exerted by each software process on a processing core; and information on communication between any of the plurality of software processes.

10. The method of claim 9, wherein the application model is an AMALTHEA model.

11. The method of claim 9, further comprising:

building an optimized application model based on the allocating of the software processes to the k cores.

12. A data processing system, comprising:

a processor configured to provide an allocation of software processes in a software application to multiple cores in a multi-core processing system having k available cores, the processor configured to:

obtain a spatial representation of the software processes in a two-dimensional plane, each process of the software processes corresponds to a node in the two-dimensional plane, and, for all nodes, the distance of any two nodes is proportional to a communication load between processes represented by said two nodes;

cluster the nodes into k clusters, wherein a number k of clusters is selected as a number of available cores in the multi-core processing system, the clustering including:

a) defining a maximum load per cluster for the k clusters based on a maximum process load per core;

b) defining k initial clusters of nodes by assigning each node to one of the k clusters, and calculating an initial current centroid for each cluster based on the position of all nodes within each cluster;

c) reassigning each node to one of the k clusters, based on a distance of the node to a current centroid of the cluster, on the defined maximum process load per core, and on a dynamic priority value of the node;

d) recalculating a current centroid of each cluster based on the clusters obtained by the reassigning of nodes; and e) repeating the reassigning step c) and the centroid calculation step d), until the centroids converge, thus obtaining a final set of clusters defined by assigned nodes;

allocate the software processes to the k cores, wherein each one of the final set of clusters of nodes is allocated to a different one of the cores.

13. A non-transitory computer-readable data carrier on which is stored a computer program for providing an allocation of software processes in a software application to multiple cores in a multi-core processing system having k available cores, the computer program, when executed by a computer, causing the computer to perform the following steps:

obtaining a spatial representation of the software processes in a two-dimensional plane, each process of the software processes corresponds to a node in the two-dimensional plane, and, for all nodes, the distance of any two nodes is proportional to a communication load between processes represented by said two nodes;

clustering the nodes into k clusters, wherein a number k of clusters is selected as a number of available cores in the multi-core processing system, the clustering step including:
  a) defining a maximum load per cluster for the k clusters based on a maximum process load per core;
  b) defining k initial clusters of nodes by assigning each node to one of the k clusters, and calculating an initial current centroid for each cluster based on the position of all nodes within each cluster;
  c) reassigning each node to one of the k clusters, based on a distance of the node to a current centroid of the cluster, on the defined maximum process load per core, and on a dynamic priority value of the node;
  d) recalculating a current centroid of each cluster based on the clusters obtained by the reassigning of nodes; and
  e) repeating the reassigning step c) and the centroid calculation step d), until the centroids converge, thus obtaining a final set of clusters defined by assigned nodes;

allocating the software processes to the k cores, wherein each one of the final set of clusters of nodes is allocated to a different one of the cores.

* * * * *